US005950879A

United States Patent [19]

Ritsche

[11] Patent Number: 5,950,879

[45] **Date of Patent: *Sep. 14, 1999**

[54] DISPENSER FOR DISCHARGING MEDIA, AS WELL AS METHOD AND DEVICE FOR FILLING A DISPENSER

[75] Inventor: Stefan Ritsche, Radolfzell, Germany

[73] Assignee: Ing. Erich Pfeiffer GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/547,041

[22] Filed: Oct. 24, 1995

[30] Foreign Application Priority Data

Oct. 27, 1994 [DE] Germany ............................ 44 38 364

[51] Int. Cl.$^{6}$ ...................................................... G01F 11/06

[52] U.S. Cl. .................... 222/321.2; 141/18; 222/321.9; 222/341

[58] Field of Search ............................ 222/321.2, 321.7, 222/321.9, 341, 402.16; 141/2, 18

[56] References Cited

U.S. PATENT DOCUMENTS

| | | | |
|---|---|---|---|
| 4,271,875 | 6/1981 | Meshberg | 141/3 |
| 4,503,997 | 3/1985 | Corsette | 222/321 |
| 4,503,999 | 3/1985 | MacNair et al. | 222/402.16 |
| 4,532,967 | 8/1985 | Graf | 141/3 |
| 4,615,470 | 10/1986 | Hyland et al. | 222/402.16 |
| 4,750,532 | 6/1988 | Grothoff . | |
| 4,944,432 | 7/1990 | Jouillat | 222/321 |
| 4,964,547 | 10/1990 | Lina | 222/385 |
| 5,511,698 | 4/1996 | Solignac . | |

FOREIGN PATENT DOCUMENTS

| | | |
|---|---|---|
| 3521580 | 8/1986 | Germany . |
| 3545409 | 7/1987 | Germany . |
| 3715300 | 11/1988 | Germany . |
| 4027320 | 3/1992 | Germany . |
| 4216915 | 11/1993 | Germany . |

*Primary Examiner*—Joseph A. Kaufman
*Attorney, Agent, or Firm*—Quarles & Brady

[57] ABSTRACT

A dispenser for discharging media, comprising: a dispenser base; a discharge deliverer for forcing the media out of the dispenser; an actuator including a discharge actuator for activating the discharge deliverer between a rest position and an actuated end position remote from the rest position; an outlet duct for the medium; a medium outlet connected to the outlet duct for discharging the media out of the dispenser; a media reservoir bounding a reservoir space and including a reservoir closure for closing the reservoir space; each of the dispenser base, discharge deliverer, actuator, outlet duct, medium outlet and media reservoir forming constituent elements of a preassembled assembly; the assembly having a filling duct for filling a filling medium from outside the dispenser into the reservoir space, the filling duct communicating with the reservoir space as the media reservoir is preassembled with the discharge deliverer; and, a bounding wall projecting toward the reservoir space close to the media reservoir, the filling duct communicating between opposite sides of the bounding wall.

18 Claims, 2 Drawing Sheets

DISPENSER FOR DISCHARGING MEDIA, AS WELL AS METHOD AND DEVICE FOR FILLING A DISPENSER

BACKGROUND OF THE INVENTION

The invention relates to a discharge apparatus for media, a method for filling a discharge apparatus with a medium, and a device for performing the aforementioned method.

The medium can be a single component or two or more components, and can be in liquid, pasty, pulverulent, and/or gaseous and similar form. Also, the media can be in the form of a flowable fluid or a filling substance.

The filling of discharge apparatuses can be difficult if the medium or the surfaces subject to action of or contact by the media during filling must be kept sterile, are sterilized, or must remain sterile after a long storage period. This is normally prevented in the fluid-tight or pressure-tight closure of the reservoir with a closure, a discharge deliverer or the like, because bacteria are introduced with the ambient air into the discharge apparatus components. In addition, the filling of the still open reservoir and its subsequent closure is labor-consuming and complicated, because, for example, the discharge apparatuses are not prepared in fully fitted form for use and the discharge apparatuses cannot be stored and then filled at a random time without further closure or fitting activities.

SUMMARY OF THE INVENTION

Objects of the invention are to provide a discharge apparatus and a method and device to solve the problems of the known constructions or improve upon the aforementioned type, because a simple and/or sterile filling is now possible.

According to the invention, means are provided for filling the reservoir in the vicinity of an already fitted closure or a discharge deliverer through a separate channel, such as, for example, suitable for the pressure compensation in the reservoir. The filling channel is tightly sealed with respect to the external atmosphere before the start of the filling, from the end of filling, and substantially over the entire use time of the discharge apparatus, so that it is only opened when the reservoir is being refilled with medium.

The discharge apparatus can have, in single or multiple arrangement: a body, a medium reservoir, a reservoir closure, a discharge deliverer, a discharge actuator, a medium outlet, an outlet channel, an inlet channel, a narrowable pressure chamber for producing a discharge delivery pressure, a filling channel or connection for the reservoir, etc., the aforementioned arrangements in random combination can form one or more preassembled standard components for assembly with the remainder of the discharge apparatus.

The filling connection bypasses the pressure chamber, inlet channel and/or outlet channel, as well as one or more valves located in the associated flow paths, for example, inlet and outlet valves, return spring means, a riser tube, etc., in a partial or complete manner. The filling connection also bypasses a fastening or clamping member, such as a crimp ring, which is used for fastening the closure or the discharge deliverer to the reservoir.

The construction according to the invention is particularly suitable for discharge apparatuses, in which the discharge deliverer is connected by means of an inlet or suction channel and/or a one-way inlet valve to the stored medium in such a way that medium is sucked into the pressure chamber and is then pressed out therefrom to the outlet opening when the pressure is raised. The construction is also suitable for discharge apparatuses, in which the entire medium can be completely discharged in a single actuating process; or in which the reservoir simultaneously forms the pressure chamber and is free from inlet openings.

Advantageously, there is a filling valve with valve closing faces located within the outwardly sealed reservoir space and/or outside the closure. The filling valve has a valve passage arranged in circular manner about a main axis of the discharge apparatus which opens in pressure-dependent manner only under the filling pressure and closes immediately, in pressure-tight, automatically resilient manner, when the filling pressure is not present.

During the filling operation, the filling channel can be separated in pressure-tight manner from a neighboring casing space, e.g. the pressure chamber, solely by one, two, or three axially succeeding sealing lips. In the case of a very compact construction, it is ensured that during filling medium does not pass into the pressure chamber.

A filling valve can also be located within the closure or discharge deliverer which is closed only in its starting position and is completely opened during the subsequent discharge actuation of the discharge apparatus.

In a method according to the invention for filling a discharge apparatus of the indicated or a similar type, the reservoir is appropriately closed in pressure-tight manner prior to filling and is then filled from the outside. The filling, although possible, does not take place from the reservoir base opposite to the closure, but from a zone spaced therefrom through at least one wall. The zone is advantageously formed by the closure unit, so that there is no need for a direct flow through a reservoir wall during filling, and the reservoir only requires a single vessel opening. Therefore, all the reservoir wall boundaries bounding the storage space can be constructed in one piece from glass or the like.

The indicated features can also apply to a pressure compensating channel by which a prefilling in the reservoir, optionally under normal pressure, is performed from the reservoir into the open to the extent with which the medium enters the reservoir. This pressure compensating channel is completely separate from the filling channel, so that during filling the pre-filling and the medium come into mutual contact only within the storage space and not elsewhere. If the discharge apparatus has an inlet or rising channel issuing in the vicinity of the reservoir bottom, it is filled upside down, namely with the reservoir bottom at the top and the reservoir closure below it, so that the mouth of the rising channel is always above the level of the medium within the prefilling. This also ensures that during filling the valve closing faces of the filling valve or valves are always scavenged in completely bubble-free manner by the medium or are immersed in the latter.

If the reservoir is to be mostly but not completely filled with the medium, for example a liquid, then the remainder of the storage space can be completely filled with an additional filler at the same time as filling or following the filling. The filler advantageously has a different aggregate state than the medium, for example the filler can be gaseous. Also, this filler can be: a germicidal or weak-reacting medium; or a gas chemically reacting in no way with the medium, such as nitrogen, such that the prefilling can be expelled completely from the storage space, and the filling channel can be cleaned.

A device for filling a discharge apparatus appropriately has a filling head, which is suitable for fluid or medium-tight connection to the filling connection of the discharge apparatus, so that the storage space and/or connection is sealed in pressure-tight manner to the outside. For opening the connection to the storage space, actuating means can be provided, which are appropriately formed by the filling head or by one or more components. These are also used for fluid guidance during filling. One or more identical and/or non-identical discharge apparatuses can be simultaneously filled by one or more filling heads.

Advantageously, in the filling state the filling head substantially only engages those faces of the discharge apparatus, which constitute outer faces, for example outer circumferential faces or outer end faces, so that the filling head does not have to engage in the interior or the inner faces of the discharge apparatus, which instead are used for medium guidance. The filling head can have two or more holding bodies movable in opposition to the discharge apparatus and which form control members, so as to keep parts or units of the discharge apparatus in different relative positions independently of the medium or fluid pressure.

BRIEF DESCRIPTION OF THE DRAWINGS

These and further features can be gathered from the claims, descriptions and drawings, and the individual features, either singly or in the form of subcombinations, can be implemented in an embodiment of the invention and in other fields and can represent advantageous, independently protectable constructions for which protection is hereby claimed. An embodiment of the invention is described in greater detail hereinafter relative to the drawings, which:

DETAILED DESCRIPTION OF THE PREFERRED EMBODIMENTS

Figure 4:
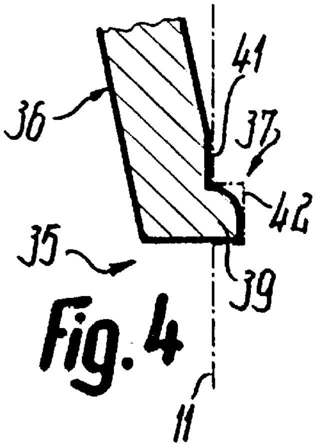
FIG. 4 shows a detail of FIG. 3 on a larger scale.
Figure 1:
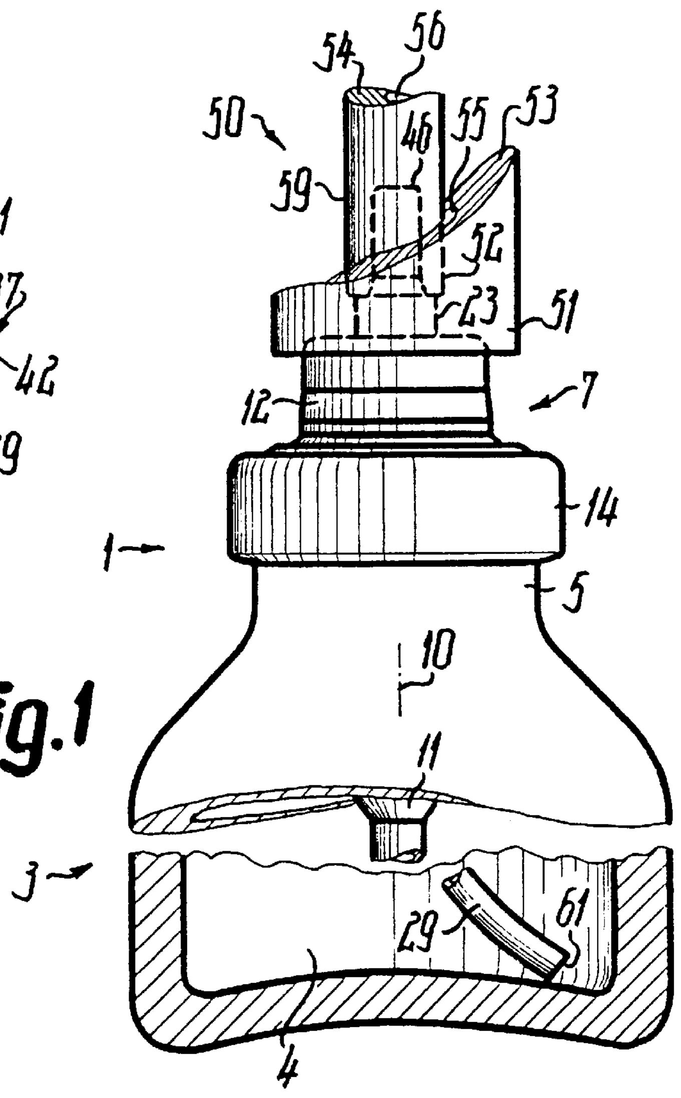
FIG. 1 shows a discharge apparatus according to the invention with a filling head in part sectional view.

The one-handed, freely carried, and simultaneously operable discharge apparatus 1 has a body 2, which contains a reservoir 3 with a storage space 4 and a narrowed neck 5 with a vessel opening 6 and a discharge deliverer 7 with a discharge actuator 8 and a casing 9, which are elongated parallel to one another. Substantially all the components and units are approximately in or parallel to a main axis 10 of the apparatus 1. The casing 9 has an elongated, thin, sleeve-like casing body 11, which at the end accessible from outside the reservoir 3 is closed by a closure, for example a separate cap 12, which engages over the associated end of the body 11 at the outer and/or inner circumference. The casing 9 has a flange 13, projecting radially from the casings 9 outer circumference, which is formed by the cap 12 and is located between the outer face of the neck 5 and a fastening member 14. The fastening member, for example a crimp ring, connects the casing 9, which is dimensionally stiff in operation, in fixed manner to the dimensionally stiff reservoir 3 by bracing.

The inner circumference of the outermost casing jacket of the casing 9 forms an engagement face or path 16 for an elongated actuating and piston unit 15, which engages with most of its length only in the interior of the casing 9. The piston unit 15 axially traverses the closure 12, and the piston units 15 free end projects, in freely accessible manner, for actuation out of the associated end of the casing 9.

The outer end is furthest removed from the wall of the reservoir 3 opposite to the discharge deliverer 7 or casing 9, whereas the inner end is closer to said wall. Completely within the casing 9, the unit 15 contains in the vicinity of its inner end a sleeve or ring-like piston 18, which closes a pressure chamber 17. The pressure chamber 17 is bounded by the cylindrical face 16 at its outer end in frontal, pressure-tight manner with a circular sealing lip 19. The piston 18 is slidingly guided under radial pretension on the path 16 so that an inwardly directed stroke movement of the unit 15 reduces the volume of the pump chamber 17, whereas an outwardly directed return stroke movement increases this volume.

From the pressure chamber 17, an outlet channel 20 leads outwards to a medium outlet 48 issuing into the open. The medium outlet 48 is normally provided on an actuating and discharge head connected, in fixed manner, to the outer end of the unit 5, or the medium outlet 48 is formed by at least one atomizing nozzle, a nozzle for a concentrated medium jet, etc. the passage cross-section is narrower than the remaining outlet channel. Following the filling of the discharge apparatus, the head can only be fixed by an axial plug connection, in use-ready manner, to the unit 15, and the head can also be detached or removed non-destructively. The outlet channel 20 traverses the interior of the unit 15 in its longitudinal direction in such a way that it is completely sealed with respect to the outer circumference. At the outlet of the medium space 17, and within a sleeve forming the piston 18, is provided an outlet valve 21 with circularly interengaging valve closing faces. The outlet valve 21 whose resiliently movable valve body, axially spaced from the end 19, is formed by the inner circumference of the member 18. A circular valve seat is formed by a frustum-shaped ring shoulder of a core body 22 partly traversing the piston 18. The core body 22 forms a component of a two-part actuating or piston ram 23, whose two elongated, equiaxial components are so axially interengaged that they secure radially between them, in position-securing manner, the outer end of the piston sleeve. Only the ram 23 projects freely from the unit 15 over the outer end of the casing 9, and in its outermost end face forms and outlet opening for medium. The outlet opening in the case of a mounted discharge head, is connected in pressure-tight manner to a corresponding channel portion located within the head and leading to the medium outlet.

Within the casing space 17 is provided a valve or return spring 24, which is supported with its outer end, via the core body 22, whereas its inner end is supported on an inner ring shoulder of the casing 9. The cross-sectionally ring-like inner space 25 of the casing 9, connected to the outer end of the space 17 and separated in pressure-tight manner therefrom by the piston 18 or lip 19, is axially increased or decreased in size, intensely proportionate to the space 17, by the movement of the unit 15. The space 25 is bounded on the inner circumference by the piston sleeve and is bounded in pressure-tight manner on the outer circumference by the wall of the casing body and on its outer end face by the closure 12. In this space 25 is located a circular valve 26, whose movable valve body is formed by a frustum-shaped portion of the outer circumference of the piston sleeve. Its valve seat is formed by a ring shoulder on the inner end of the closure 12. The valve body and valve seat are formed by valve parts. In the described valves the piston sleeve 18 forms axially adjacently movable valve parts, whereas the core body 22 and the closure 12 in each case form a fixed valve part. All parts of the valve 21 also perform the working or strike movements of the unit 15, which is mounted in axially displaceable and/or rotary manner with respect to the remaining fixed, interconnected components by force action on the ram 23. Each of the components 3, 5, 7, 9, 11, 12, 13, 14, 16 can form the basic body, and substantially all the described arrangements and components are roughly parallel to the axis 10.

The space 17 is also connected to the storage space 4 by means of a one-way inlet valve 27, which advantageously is located on the inner end of the space 17 or the body 11. The inlet valve 27 has a valve body, such as a valve ball, which is movable in stop-limited manner without spring loading between a closed position and an open position. The inner end of the spring 24 forms a circular stop 28 for the open position of the valve body. The circular stop 28 is constructed in sleeve-like manner by axially, clearance-free, closely engaging spring turns, which are located at a small radial distance from the inner circumference of the casing jacket. The circular stop 28 projects in contact-free manner axially against the valve body and the end or stop face can be centered radially and automatically with respect to the engaging valve body. If the apparatus 1 is turned upside down, then the valve body falls against the stop 28 and the circular valve passage of the valve 27 is opened. The valve 27 is connected by its outer end to an inlet channel 29, for example a flexible hose, a riser tube, etc., and an inlet opening 61 on the bottom of the storage space 4.

The unit 7 or the casing 9 mostly projects through the casing opening 6 bounded by the inner circumference of the neck 5 into the storage space 4 in free and substantially contact-free manner. An externally accessible filling opening 31 of a channel-like filling connection 30 is located in the plane of the outer end face of the casing 9. The filling opening 31 is bounded, like a connecting channel portion 32, by the inner circumference of the casing 9 or the closure 12, the outer circumference of the unit 15 or the ram 23, the piston sleeve, and the valve 26. Valve 26 directly issues into the space 25, and is located on the inner end of said portion 32. The portion 32 can be formed by longitudinal grooves in one or both of the aforementioned circumferences, so that the portion 32 is distributed in substantially uniform, circular manner around the axis 10. The space 25 forms the circular channel portion 33.

Figure 3:
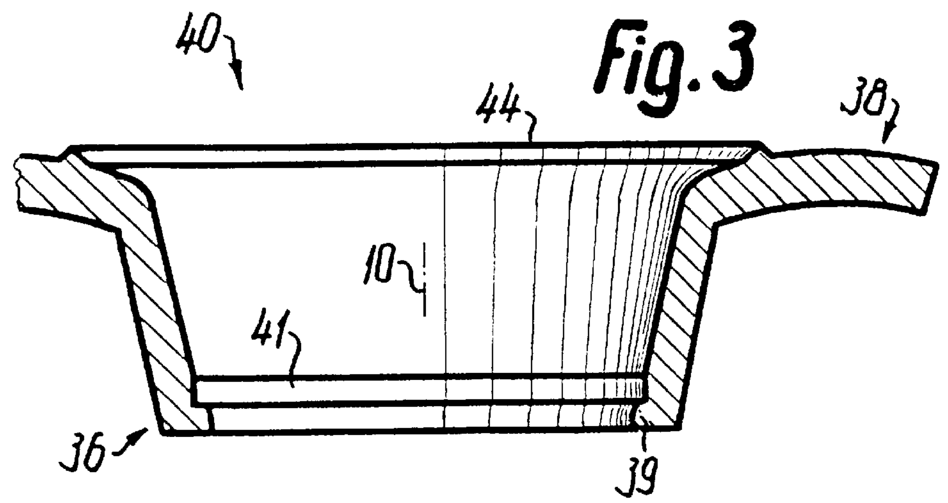
FIG. 3 shows a closure body of the discharge apparatus in axial section.

In the vicinity of the portion 33 the jacket of the casing 9 or only the body 11 is traversed by one or more uniformly circumferentially directed openings 34. The openings 34 are elongated and axially slot-like and can have a width approximately the same as the wall thickness. In any actuation state, these openings 34 are outside the space 17 and issue in the vicinity of the opening 6, radially into the interior of the neck 5, or into the annular space bounded in its axial zone by the outer circumference of the body 11 and bounded on the outer face by the flange 13. Inwardly and axially directly adjacent to the openings 34, the annular space or channel portion is closed by a valve 35, which engages on the outside of the units 7, 9 or 11 within the neck 5 or the sealed vessel space of the reservoir 3. The valve 35 has radial spacing from the inner circumference of said vessel space and is axially inwardly spaced from the opening 6. The valve 35 has an inwardly constricted, jacket or sleeve-like valve body 36 which is acute-angled and frustum-shaped and a valve seat 37 associated therewith or other valve parts. The valve body 36 forms a standard component with a ring disk-like seal 38, which outwardly seals in pressure-tight manner the gaps between the vessel space or vessel 3 and the closure unit 7 or transfers the tension of said mutual bracing of the units. The seal 38 is located between the outer face of the neck 5 and the inner face of the flange 13. The seal forms, together with the valve body 36, a one-piece component 40 according to FIG. 3.

On the inner end, the valve body 36 has an annular closing part or torus 39 projecting inwardly in one piece over its inner circumference. The valve body 36 has a valve seat 37 with a circular groove 42 which projects directly in the outer circumference of the casing 11, so that both axially adjacent circumferential faces and also ring edges or faces can form several valve closing faces. The valve seat 37 is directly adjacent to the inner end of the openings 34. The valve body 36 or closing part 39 is elastically resiliently and radially widenable from the closed position under medium pressure, so that the closing part 39 is raised from the valve seat 37, and the valve passage is opened for use of the openings 34 with the storage space 4. The channel portion located in the flow direction between the openings 34 and the valve 35 is bounded on the outer circumference by the inner circumference of the valve body 36. Outwardly and connected onto the closing part 39, the inner circumference forms a cylindrical closing face 41, which, in the closed position, can engage in closing manner in approximately full-surface form, on the outer circumference of the casing 11 up to the associated end of the openings 34. Through the cam 39, the component 40 can be preassembled securely with the unit 7 and then fitted to the body 3.

Figure 2:
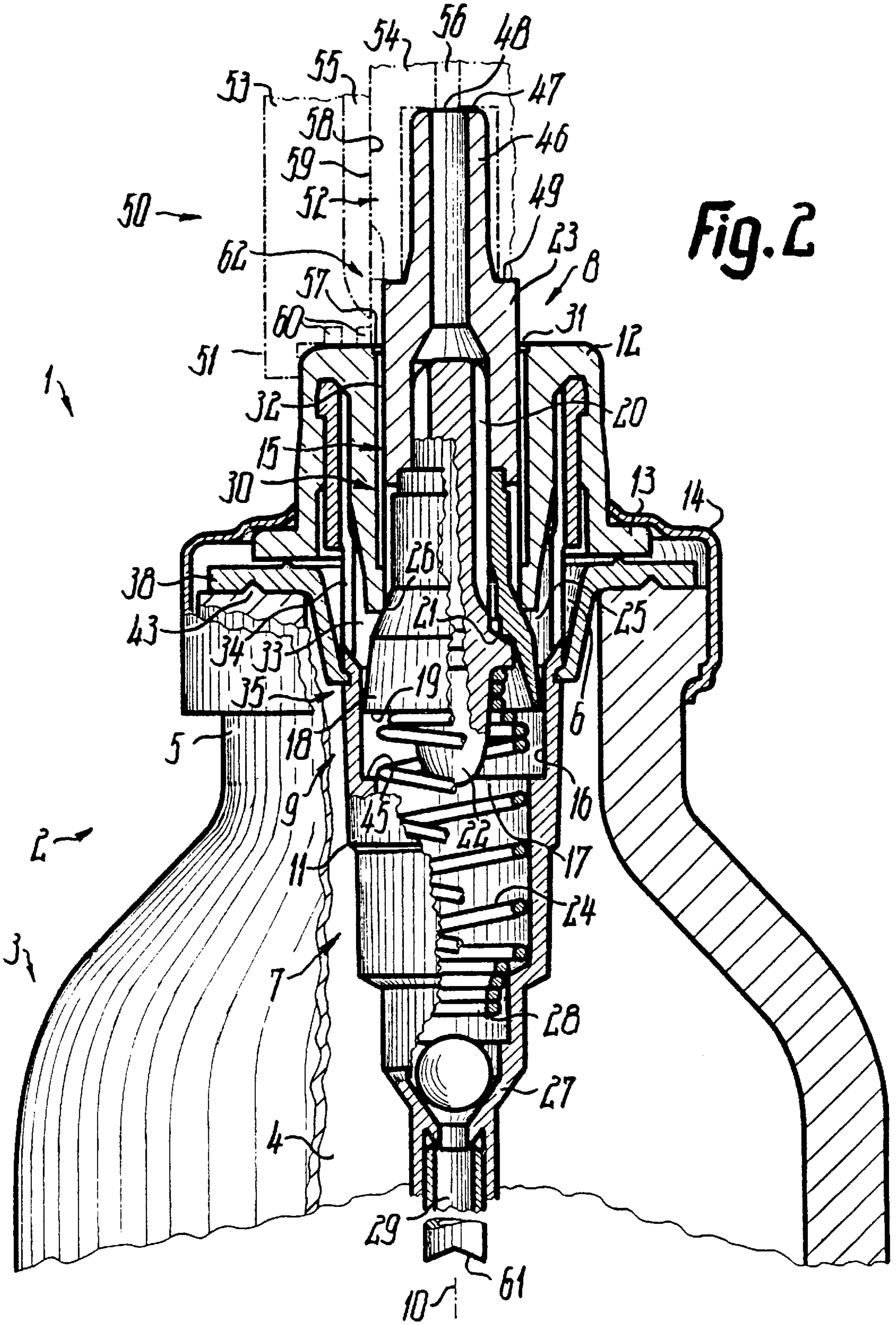
FIG. 2 shows a detail of the discharge apparatus of FIG. 1 on a larger scale and in a sectional representation.

On its free face or contact face for the seal 38, in spaced manner between its inner and/or outer circumference, the neck 5 has in one piece one or more projections, for example a cross-sectionally pointed notched ring 43. The ring 13 presses into the associated, front counterface of the seal 38, so that the seal 38 is correspondingly cross-sectionally squeezed and forms a depression completely adapted to the projection 43, which is not provided when the seal is relaxed. On the other face, the seal 38 can itself form a corresponding, projecting, circular and pressure-elastic projection, such as a frontal sealing lip 44, which is circular and is spaced from the inner and/or outer circumference of the seal 38, but is appropriately inwardly radially displaced with respect to the notched ring 43. Immediately adjacent to the sealing lip 44, the valve body 36 passes in angular manner into the inner circumference of the seal 38, which is concavely curved in the relaxed state in cross-section towards the inner face. On axially bracing the flange 13 with respect to the reservoir 3 and the seal 38, the ring lip 44 engaging on the inner face of the flange 13 is completely pressed flat, so that it no longer projects over the associated, planar face of the seal 38. Also, the curvature is pressed flat. The two seal systems can be provided, as desired, on both ends of the seal 38 and are very effective in the case of a very simple seal constructions. On the outer, ring-like face of the flange 13 engages the fastening member 14, which also engages over an outer collar of the neck 5 on a ring-like face remote therefrom. To the left in FIG. 2, the fastening member 14 is shown before position fixing or bracing. To the right, following fixing or bracing, the fastening member 14 engages behind two axially spaced, frontal ring faces of different width of the neck 5.

The valve 21 is path-dependent, and due to an overpressure in the space 17, can only be opened or closed in pressure-dependent manner. If the unit 15 is moved inwards, the piston 18 with its end face 19 is limited in motion by a stop 45 of the unit 7, 9, 11, which is formed by an inner ring shoulder in the space 17 or by the inner end of the path 16. Thus, the valve sleeve is positively fixed against further movement, whereas the remaining ram 23, under elastic compression of the sleeve neck, can be moved further. Thus, the valve seat is raised from the body of the valve 21 and the valve 21 is opened only at the end of the lifting or stroke movement of the sealing body 18. At the start of the aforementioned movement, the pretensioned closed valve 26 opens. With a small movement of the unit 15, only the valve 26 can be opened, whereas with a larger movement, both valves 21, 26 are simultaneously opened. On freeing from actuation, both valves 21, 26 are closed by the spring 24, which also returns the unit 15 to its starting position. The neck of the piston sleeve forms a stop acting in opposition to the spring 24.

The outermost end of the ram 23 forms an outside width-reduced connecting or plugging piece 46 used with the discharge head and with a filling head 50 of a filling device. The filling head after filling is completely removed from the apparatus 1 and replaced by the discharge head. In the outermost end face 47 of the plugging piece 46 is located the outlet opening 48 of the outlet channel 20, or a corresponding venting channel or the like. At the inner end, over the outer circumference of the plugging piece 46, projects a stop 49 in the form of a ring shoulder, which forms the transition to the portion bounding the channel portion 32. The filling head 50 has a connecting member 51 for the tight connection to the outermost end of the casing 9 or the closure 12. The connecting member 51 engages the casing 9 outsider the reservoir 3 and the fastening member 14, on the outer circumference of the closure 12, and the connecting member 51 engages in sealing manner on its outer end face. The connecting member 52, located radially completely within the connecting member 51, is used in the same way for axial plug connection to the connecting piece 46, which it also engages around the outer circumference and sealingly engages on one or both faces 47, 49.

Each connecting member 51, 52 forms an optionally one-piece standard component with a ram-like control body 53 or 54, which then forms the associated connecting member with its inner end. The control body 54, like the connecting member 52, is axially displaceably or rotatably mounted within the unit 51, 53, so that the interengaging circumferences of these two units close in pressure-tight manner the associated gap. In the circumference of one or both units and in particular only in the inner circumference of the unit 51, 53, there are one or more uniformly circumferentially distributed, axial filling channels 55, which are formed by a longitudinal groove in the associated circumference. The channels 55 are closed on the open groove longitudinal side by the countercircumference, so as to be cross-sectionally circumferentially closed. Thus, the filling channel 55 issues close to the inner end of the unit 52, 54 into an annular space, which is bounded by the inner circumference of the unit 51, 53; the outer circumference of the unit 15 or 23 radially spaced therefrom; and frontally by the end of the unit 52, 54 and the outer face of the casing 9 spaced facing the latter. Whereas in the outer face of the casings is located the filling opening 31, while the inner end face of the unit 52, 54 can engage in pressure-tight manner on the stop 49 or the bottom face of the connecting member 52 can engage in pressure-tight manner on the face 47.

For filling the storage space 4, both units 51, 53 and 52, 54 are brought in a synchronous axial movement or successively into the described engagement with the apparatus, and thus it is possible to have them upright, upside down, or adopt a corresponding sloping position, which is sufficient to transfer the valve 27 by weight force into the open position or to reduce its closing forces. The inlet end of the filling channel 55 is connected by means of a suitable pressure generator, such as a pump, pressure container, etc. and via a control valve to a not shown large medium reservoir. The reservoir contains a quantity of the medium which can be received by the storage space 4. Following the connection of the filling head 50, the discharge deliverer 7 is initially in the starting position. Then, or before the connection of the part 51, the ram 54 is displaced with respect to the ram 53. Consequently, the control unit 8 of the closure for the storage space 4 is moved axially inward, and initially, only the valve 26 has to be opened. The annular space connected to the filling opening 31 connects with the filling outlet 57 of the filling channel 55, so that medium from the outlet 57 directly enters the filling openings 31, passes radially out of the casing 9 along the channel portions 32, through the valve 26 and the space 33, and to the openings 34. On the inner circumference of the still closed valve body 36, an overpressure consequently builds up, which displaces the valve closing part 39 radially outward into the open position. The medium now enters through the opened valve under an overpressure into the storage space 4. Simultaneously with the start of filling, or only after reaching a predetermined overpressure in the storage space 4, the valve 21 is opened by actuating the ram 54. The line connection between the inlet opening 61 of the inlet channel 29 and the outlet opening 48 is now free for the through-flow and, by means of the channel 20, air or gas can pass from the storage space 4, through the opening 48, and into a vent channel 56 of the unit 52, 54. In the upside down position, the inlet opening 61 is always above the filling level in the storage space 4. For venting purposes, the valve 21 can be opened either by path-dependent manner by actuation by means of the stop 45, or also by pressure-dependent manner, so that it immediately closes, like the filling valve 35, with increasing pressure within the storage space 4.

The filling channel 55 is over most of its length into the inner circumference 58 of the unit 51, 53. In the vicinity of the inner end of the unit 52, 54, the channel 55 can also be countersunk into the units 52, 54 outer circumference 59. The two units 51, 53 and 52, 54 can also form a complete filling valve 62 associated with the head 50. Prior to the connection of the head 50 or after the filling, and prior to the removal of the head So from the apparatus 1, the filling valve 62 can be closed in the vicinity of the filling outlet 57, so as to completely avoid any dripping of medium. For this purpose, the unit 52, 54 can form a movable valve body, whose outer circumference 59, in the manner of a slide valve, closes in path-dependent manner the inner end of the filling channel 55 on the inner circumference 58 of the unit 51, 53, before the unit 51, 53 is removed from the countermember of the apparatus 1. The inner end face of the unit 52, 54 can be moved for this purpose, for example, approximately up to the inner face of the unit 51, 53, which engages in pressure-tight sealed manner by the seal 60 on the outer face of the closure 12. A seal can be directly connected to the filling opening 31 and a seal 60 can be radially spaced outside the same. Corresponding seals can be provided in the vicinity of the face 47 or 49. The described functions, particularly of the valves 21, 26, 62, can be brought about by a corresponding choice of the reciprocal spacings between the stops 45, 49 and the outer face of the closure 12. After the filling with the medium by means of the channel 55 or some other channel of the head 50, a protective or inert gas, for example nitrogen, can be forced into the storage space, so as to expel all air present therein via the channel 20.

The discharge deliverer 7 is constructed as a self-sucking thrust piston pump, which during the return stroke, by means of the inlet channel 29, sucks medium from the storage space 4 into the space 17 under pressure-dependent opening of the valve 27. If the storage space 4 is not filled under an overpressure or the inert gas is compressed under an overpressure, the filling connection 30 is also suitable for the pressure compensation of the storage space 4, provided that its opening forces are correspondingly adjusted. If the pumping out of medium leads to a vacuum in the storage space 4, then the valve body 36 opens in pressure-dependent manner and by means of the filling connection 30, air can flow from the outside into the storage space 4. However, with an overpressure in the storage space 4 the closing forces of the valve 35 are correspondingly increased, because the outer circumference of the valve body 36 is exposed to this overpressure. If the valve body 36 is displaced by mechanical actuation or complete removal into the open position, then the filling connection 30 forms a pressure compensating or venting connection for the storage space 4 opened by manual actuation in any actuating state, other than the starting state, with the valve 26 open.

I claim:

1. A discharge apparatus for discharging media, comprising:

a base for the apparatus;

a discharge deliverer for forcing the media out of said apparatus;

an actuator including a discharge actuator for activating said discharge deliverer between a rest position and an actuated end position remote from the rest position;

an outlet connection for the medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer; and, said media reservoir having a bounding wall bounding said storage space and including a reservoir closure for closing said storage space, said bounding wall projecting toward said storage space parallel to an assembly axis and close to said media reservoir, said filling connection traversing through said bounding wall transverse to said assembly axis; where, each of said base for the apparatus, discharge deliverer, actuator, outlet connection, medium outlet, and storage space form constituent elements of said preassembled assembly.

2. The apparatus according to claim 1, further comprising:

said discharge deliverer having a deliverer housing projecting inside said storage space and traversed by said media when discharged, said deliverer housing bounding said storage space; and, a socket externally enveloping said deliverer housing inside said media reservoir, said socket circumferentially sealingly engaging said deliverer housing on an outside surface directly bounding said storage space, said socket including an outer circumferential face bounding said storage space.

3. A discharge apparatus for discharging media, comprising:

a base for the apparatus;

a discharge deliverer for forcing said media out of said apparatus;

an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir, a preassembled assembly having a filling connection for filling a filling medium from outside said apparatus into a storage space as said media reservoir is preassembled with said discharge deliverer; and, said media reservoir having a bounding wall bounding said storage space and including a reservoir closure for closing said storage space, said bounding wall projecting toward said storage space close to said media reservoir, said filling connection communicating between opposite sides of said bounding wall; where, each of said base for the apparatus, discharge deliverer, actuator, outlet connection, medium outlet, and media storage space forming constituent elements of said preassembled assembly;

said filling connection and said bounding wall have a passage opening communicating through said bounding wall; and, said filling connection communicates between opposite sides of a filling closure downstream of said passage opening, said filling connection being thereby adapted for filling the storage space with the media to be discharged.

4. A discharge apparatus for discharging media, comprising:

a base for the apparatus;

a discharge deliverer for forcing said media out of said apparatus;

an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer; and, said media reservoir having a bounding wall bounding said storage space and including a reservoir closure for closing said storage space, said bounding wall protecting toward said storage space close to said media reservoir, said filling connection communicating between opposite sides of said bounding wall; where, each of said base for the apparatus, discharge deliverer, actuator, outlet connection, medium outlet, and media storage space forming constituent elements of said preassembled assembly;

said bounding wall defines an outside surface and an inside surface remote from said outside surface, said outside surface being located downstream from said inside surface with respect to filling said storage space and said inside surface defining a filling chamber not connected to said outlet connection;

said filling connection passes through said bounding wall from said inside surface to said outside surface;

said filling connection has a passage opening connecting directly to said filling chamber; and, said filling chamber is closed with respect to said storage space except when said storage space is being filled.

5. The apparatus according to claim 4, wherein:

said discharge deliverer includes a pressure chamber for pressurizing the media by actuating said discharge actuator;

said inside surface circumferentially bounds said pressure chamber.

6. The apparatus according to claim 4, wherein:

said discharge deliverer includes a pump piston slideably engaging said inside surface along a piston lip, said piston lip being displaceable along said inside surface over a stroke path; and, said filling connection communicates across said inside surface apart from said stroke path.

7. A discharge apparatus for discharging media, comprising:

a base for the apparatus;

a discharge deliverer for forcing said media out of said apparatus; an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer; and, said media reservoir having a bounding wall bounding said storage space and including a reservoir closure for closing said storage space, said bounding wall projecting toward said storage space close to said media reservoir, said filling connection communicating between opposite sides of said bounding wall; where, each of said base for the apparatus, discharge deliverer, actuator, outlet connection, medium outlet, and media storage space forming constituent elements of said preassembled assembly;

said bounding wall has a housing jacket defining a central axis, said housing jacket defining a circumferential jacket inside and a circumferential jacket outside; and, said filling connection including a passage opening radially traversing said housing jacket from said circumferential jacket inside to said circumferential jacket outside, said filling connection being provided for filling the storage space with the media to be discharged.

8. A discharge apparatus for discharging media, comprising:

a base for the apparatus;

a discharge deliverer for forcing said media out of said apparatus;

an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer;

said media reservoir having a bounding wall bounding said storage space and including a reservoir closure for closing said storage space, said bounding wall projecting toward said storage space close to said media reservoir, said filling connection communicating between opposite sides of said bounding wall;

a filling valve for opening and closing said filling connection, said filling valve having a first valve body and a second valve body, said second valve body being displaceable with respect to said first valve body and said bounding wall for opening said filling valve; and, said second valve body having a holding member fixedly connected with said media reservoir;

where, each of said base for the apparatus, discharge deliverer, actuator, outlet connection, medium outlet, and media storage space forming constituent elements of said preassembled assembly.

9. The apparatus according to claim 8, wherein:

said first valve body is integral with said bounding wall; and, said bounding wall is stationary with respect to said media reservoir.

10. The apparatus according to claim 8, wherein:

said bounding wall defines an outside surface bounding said storage space and a inside surface remote from said outside surface;

said second valve body moves away from said outside surface for opening said filling valve; and, said filling connection has a passage opening penetrating said bounding wall, said bounding wall projecting beyond said passage opening into said storage space.

11. The apparatus according to claim 8, wherein said filling connection includes a venting duct for venting said storage space when said storage space is emptied.

12. The apparatus according to claim 8, wherein said second valve body sealingly rests against said first valve body at two separate and mutually axially-spaced circumferential closure seats.

13. The apparatus according to claim 8, wherein one of said first and second valve bodies includes a radially projecting closing bead having at least one closure face for sealingly closing said filling valve.

14. The apparatus according to claim 8, wherein one of said first and second valve bodies includes a closing recess having at least one closure face for sealingly closing said filling valve.

15. The apparatus according to claim 8, wherein:

said filling valve defines a first filling valve;

said filling connection has a second filling valve located upstream of said first filling valve, and, said second filling valve is simultaneously and mechanically opened by actuating said discharge actuator away from said rest position.

16. A discharge apparatus for discharging media, comprising:

a base for the apparatus;

a discharge deliverer for forcing said media out of said apparatus;

an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer;

said media reservoir having a bounding wall bounding said storage space and including a reservoir closure for closing said storage space, said bounding wall projecting toward said storage space close to said media reservoir, said filling connection communicating between opposite sides of said bounding wall; where, each of said base for the apparatus, discharge deliverer, actuator, outlet connection, medium outlet, and media storage space forming constituent elements of said preassembled assembly said discharge deliverer having a deliverer housing projecting inside said storage space and traversed by said media when discharged, said deliverer housing bounding said storage space;

a socket externally enveloping said deliverer housing inside said media reservoir, said socket circumferentially sealingly engaging said deliverer housing on an outside surface directly bounding said storage space;

a sealing member located between said media reservoir and said deliverer housing, said sealing member and said socket forming an assembly subunit of said reservoir closure, said socket axially projecting from said sealing member when said dispenser is unactuated and said assembly subunit being separate from said media reservoir and said deliverer housing; and, a tensioning member for tensioning said sealing member against said media reservoir, said tensioning member being separate from said assembly subunit.

17. A discharge apparatus for discharging media, comprising:

a base for the apparatus;

a discharge deliverer for forcing said media out of said apparatus;

an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer;

said media reservoir having a bounding wall bounding said storage space and including a reservoir closure for closing said storage space, said bounding wall protecting toward said storage space close to said media reservoir, said filling connection communicating between opposite sides of said bounding wall; where, each of said base for the apparatus, discharge deliverer, actuator, outlet connection, medium outlet, and media storage space forming constituent elements of said preassembled assembly said discharge deliverer having a deliverer housing projecting inside said storage space and traversed by said media when discharged, said deliverer housing bounding said storage space; and, a socket externally enveloping said deliverer housing inside said media reservoir, said socket circumferentially sealingly engaging said deliverer housing on an outside surface directly bounding said storage space;

said deliverer housing and said socket are directly interconnected with a snap connection, said snap connection including a snap recess (42) and a snap projection (39) positively engaging said snap recess (42).

18. A discharge apparatus for discharging media, comprising:

a base for the apparatus;

a discharge deliverer for forcing said media out of said apparatus;

an actuator including a discharge actuator for activating said discharge deliverer between a rest position and an actuated end position remote from said rest position;

an outlet connection for said medium;

a medium outlet connected to said outlet connection for discharging said media out of said apparatus;

a media reservoir;

a preassembled assembly having a filling connection for filling a filling medium from outside said apparatus into a storage space as said media reservoir is preassembled with said discharge deliverer;

an outlet valve for the medium; and, said media reservoir having a bounding wall bounding said storage space and including a reservoir closure for closing said storage space, said bounding wall projecting toward said storage space close to said media reservoir, said filling connection communicating between opposite sides of said bounding wall; where, each of said base for the apparatus, discharge deliverer, actuator, outlet connection, medium outlet, and media storage space forming constituent elements of said preassembled assembly said filling connection being provided for filling said storage space with said media and for venting said storage space with a fluid upon being emptied, said filling connection entirely bypassing said outlet connection, and said outlet connection being bounded by an outlet valve and said medium outlet, the media being liquid and the fluid containing ambient air flowing into said storage space upon a fall of pressure from environmental air to said storage space.

* * * * *

UNITED STATES PATENT AND TRADEMARK OFFICE

CERTIFICATE OF CORRECTION

PATENT NO. : 5,950,879
DATED : September 14, 1999
INVENTOR(S) : Ritsche

It is certified that error appears in the above-identified patent and that said Letters Patent is hereby corrected as shown below:

Column 4,
Line 53, replace "intensely" with -- inversely --.

Column 10,
Lines 43-44, replace "protect-ing" with -- project --.

Column 13, claim 17,
Lines 53-54, replace "protect-ing" with -- project --.

Signed and Sealed this

Eleventh Day of September, 2001

Attest:

*Nicholas P. Godici*

NICHOLAS P. GODICI

*Attesting Officer*

*Acting Director of the United States Patent and Trademark Office*